(12) United States Patent
Liang

(10) Patent No.: US 9,571,335 B2
(45) Date of Patent: *Feb. 14, 2017

(54) COMPUTER NETWORK METHOD AND DEVICE USING LINK AGGREGATION

(71) Applicant: Hewlett Packard Enterprise Development LP, Houston, TX (US)

(72) Inventor: Xuewei Liang, Hangzhou (CN)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 37 days.

This patent is subject to a terminal disclaimer.

(21) Appl. No.: 14/745,050

(22) Filed: Jun. 19, 2015

(65) Prior Publication Data

US 2015/0288561 A1 Oct. 8, 2015

Related U.S. Application Data

(63) Continuation of application No. 13/876,142, filed as application No. PCT/CN2011/001622 on Sep. 26, 2011, now Pat. No. 9,094,293.

(30) Foreign Application Priority Data

Sep. 26, 2010 (CN) .......................... 2010 1 0292572

(51) Int. Cl.
*H04L 1/22* (2006.01)
*H04L 12/24* (2006.01)
(Continued)

(52) U.S. Cl.
CPC ......... *H04L 41/0668* (2013.01); *H04L 45/245* (2013.01); *H04L 49/552* (2013.01); *H04L 41/0663* (2013.01); *Y02B 60/33* (2013.01)

(58) Field of Classification Search
CPC .............. H04L 45/28; H04L 47/10; H04J 3/14
See application file for complete search history.

(56) References Cited

U.S. PATENT DOCUMENTS

2004/0228278 A1 11/2004 Bruckman et al.
2006/0251074 A1 11/2006 Solomon
(Continued)

FOREIGN PATENT DOCUMENTS

CN 1949701 4/2007
CN 101013995 8/2007
(Continued)

OTHER PUBLICATIONS

CN First Office Action dated Jul. 25, 2013 issued on CN Patent Application No. 201010292572.3 dated Sep. 26, 2010, The State Intellectual Property Office, P.R. China.
(Continued)

*Primary Examiner* — Andrew Lee
(74) *Attorney, Agent, or Firm* — Hewlett Packard Enterprise Patent Department

(57) ABSTRACT

A method and device of link aggregation in computer networking, wherein data originally scheduled for forwarding by a scheduled data port are diverted for forwarding by a backup data port assigned to the scheduled data port upon detection that the scheduled data port is connected to a data link which is not capable of data traffic even though the data port is still a selected port.

15 Claims, 4 Drawing Sheets

(51) Int. Cl.
*H04L 12/709* (2013.01)
*H04L 12/939* (2013.01)

(56) References Cited

U.S. PATENT DOCUMENTS

| | | | |
|---|---|---|---|
| 2007/0165520 A1 | 7/2007 | Messing et al. | |
| 2007/0288526 A1* | 12/2007 | Mankad | G06F 11/1662 707/999.2 |
| 2007/0294319 A1* | 12/2007 | Mankad | G06F 11/1662 707/999.204 |
| 2008/0088428 A1* | 4/2008 | Pitre | G08B 25/016 340/506 |
| 2008/0112312 A1 | 5/2008 | Hermsmeyer et al. | |
| 2009/0063708 A1 | 3/2009 | Sultan et al. | |
| 2009/0225752 A1* | 9/2009 | Mitsumori | H04L 45/245 370/390 |
| 2010/0195489 A1 | 8/2010 | Zhou et al. | |
| 2010/0246388 A1 | 9/2010 | Gupta et al. | |
| 2010/0274982 A1* | 10/2010 | Mehr | G06F 11/1458 711/162 |
| 2011/0085562 A1 | 4/2011 | Bao et al. | |
| 2011/0235523 A1 | 9/2011 | Jha et al. | |
| 2011/0286342 A1 | 11/2011 | Ee et al. | |
| 2011/0299536 A1 | 12/2011 | Cheng et al. | |
| 2012/0014284 A1 | 1/2012 | Ranganathan et al. | |
| 2014/0204729 A1* | 7/2014 | Zhang | H04L 45/245 370/218 |
| 2015/0271104 A1* | 9/2015 | Chikkamath | H04L 49/25 370/401 |

FOREIGN PATENT DOCUMENTS

| | | |
|---|---|---|
| CN | 101102222 | 1/2008 |
| CN | 101692652 | 4/2010 |
| CN | 101771570 | 7/2010 |

OTHER PUBLICATIONS

CN Fourth Office Action dated Dec. 17, 2014, CN Patent Application No. 201010292572.3 dated Sep. 26, 2010, State Intellectual Property Office of the P.R. China.
CN Second Office Action dated Mar. 18, 2014, CN Patent Application No. 201010292572.3 dated Sep. 26, 2010, State Intellectual Property Office of the P.R. China.
CN Third Office Action dated Sep. 2, 2014, CN Patent Application No. 201010292572.3 dated Sep. 26, 2010, State Intellectual Property Office of the P.R. China.
International Search Report and Written Opinion dated Jan. 5, 2012 issued on PCT Patent Application No. PCT/CN2011/001622 filed Sep. 26, 2011, The State Intellectual Property Office, the P.R. China.
US Office Action dated Dec. 16, 2014, U.S. Appl. No. 13/876,142 dated Sep. 26, 2011, United States Patent and Trademark Office.

* cited by examiner

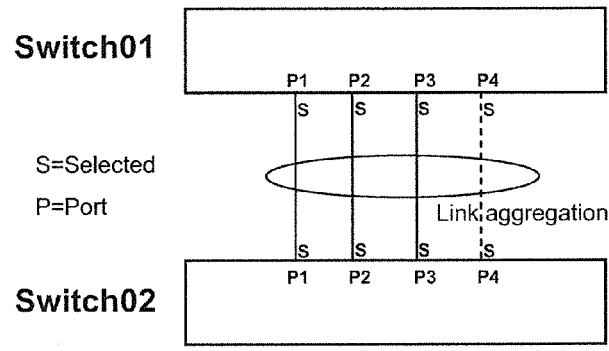
Figure1 (prior art)
|  |  | S5800(Ge port) (ms) | | S3600(Fe port) (ms) | | S3100(Fe port) (ms) | |
| --- | --- | --- | --- | --- | --- | --- | --- |
|  |  | Failure | Recovery | Failure | Recovery | Failure | Recovery |
| shut/undo shut | Downlink | 113.41 | 3.5 | 112.21 | 3.6 | 114.11 | 3.2 |
|  | Uplink | 1.6 | 1.4 | 1.7 | 1.3 | 2.1 | 2.1 |
| Plug out/in | Downlink | 112.01 | 0.4 | 242.12 | 2.1 | 242.12 | 2.1 |
|  | Uplink | 315.63 | 4.9 | 147.41 | 4.8 | 147.61 | 5.4 |
Figure 2
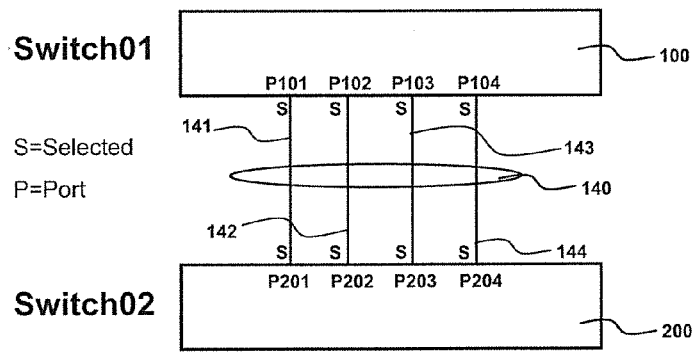
Figure 3

COMPUTER NETWORK METHOD AND DEVICE USING LINK AGGREGATION

CROSS REFERENCE TO RELATED APPLICATION

This application claims priority to and is a Continuation Application of U.S. patent application Ser. No. 13/876,142, filed on Mar. 26, 2013, entitled, "Computer Network Method and Device Using Link Aggregation," which is a national stage filing under 35 U.S.C 371 of PCT application number PCT/CN2011/001622, having an international filing date of Sep. 26, 2011, which claims priority to Chinese Patent Application No. 201010292572.3, filed on Sep. 26, 2010, the disclosures of which are hereby incorporated by reference in their entireties.

BACKGROUND

Link aggregation is a term encompassing various methods of combining multiple network connections in parallel to increase the rate of data throughput beyond what a single connection could support, and to provide redundancy in case one of the data links forming the link aggregation fails. The term link aggregation does not only encompass vendor independent standards such as LACP ("Link Aggregation Control Protocol'), IEEE 802.3ad-2000 for Ethernet, and the technology independent IEEE 802.1ax-2008; but also other proprietary network solutions. Link aggregation technique is widely used in computer networking to increase bandwidth and enhance link reliability, and can be implemented at any of the lowest three layers of the OSI model, namely, physical, data link, or network layers. Common examples of aggregation at layers 1, 2 and 3 are, respectively, power line (IEEE 1901) and wireless (IEEE 802.11); data link layer such as Ethernet frame in local area networks (LANs) or multiple-link point-to-point protocol (PPP) in WANs; and at the network layer (e.g. IP or IPX).

BRIEF DESCRIPTION OF DRAWINGS

The present disclosure will be explained below by way of example with reference to the accompanying Figures, in which:

FIG. 1 is a schematic diagram depicting two network devices connected by utilizing a link aggregation methodology, FIG. 2 is a table showing exemplary simulated data loss time in the exemplary network of FIG. 1, FIG. 3 is a schematic diagram depicting two network devices connected by utilizing a link aggregation methodology.

DETAILED DESCRIPTION

Figure 3A:
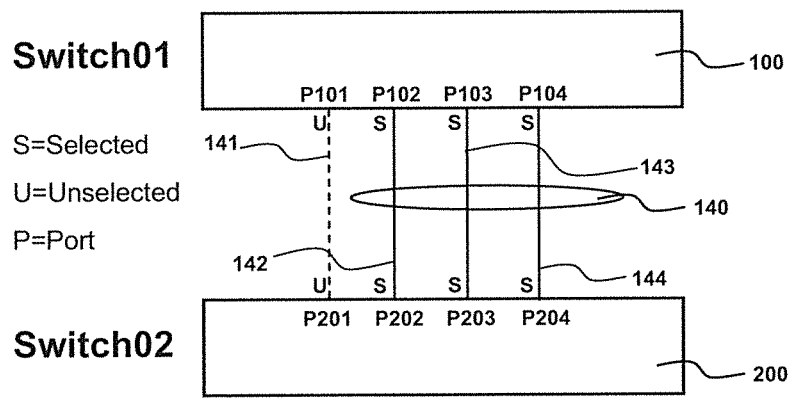
FIG. 3A depicts the network of FIG. 3 when a data link is detected as faulty.
Figure 4:
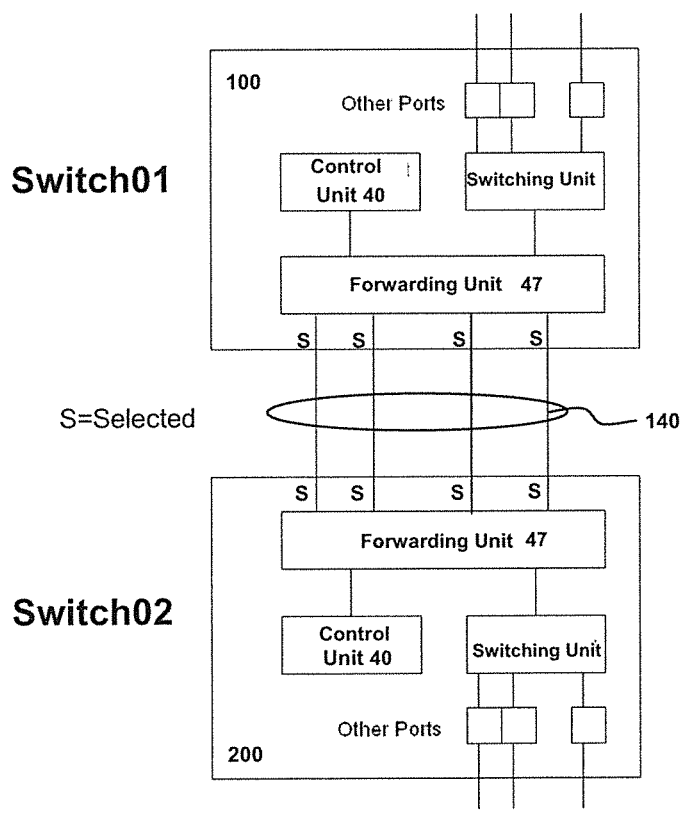
FIG. 4 is a schematic diagram depicting the network devices of FIG. 3 in more detail.
Figure 5:
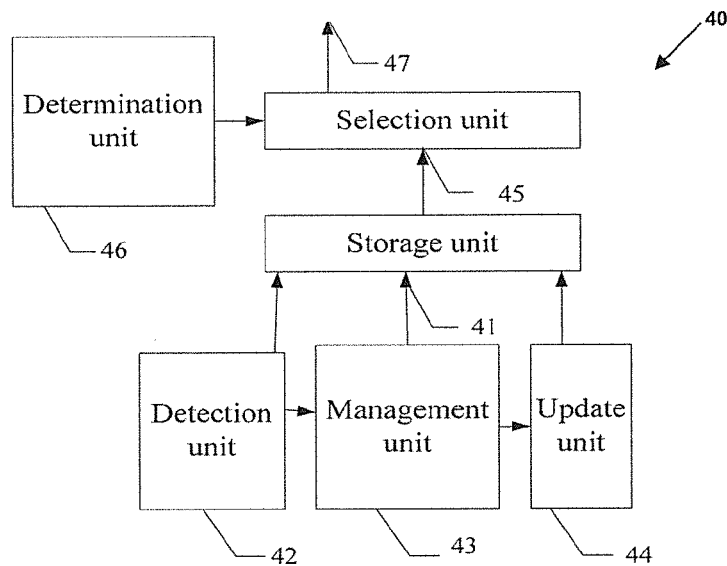
FIG. 5 is a schematic diagram showing the control unit 40 of FIG. 4 in more detail.
Figure 6:
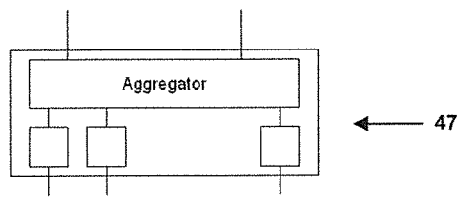
FIG. 6 is a schematic diagram showing the forwarding unit 47 of FIG. 4 in more detail.
Figure 7:
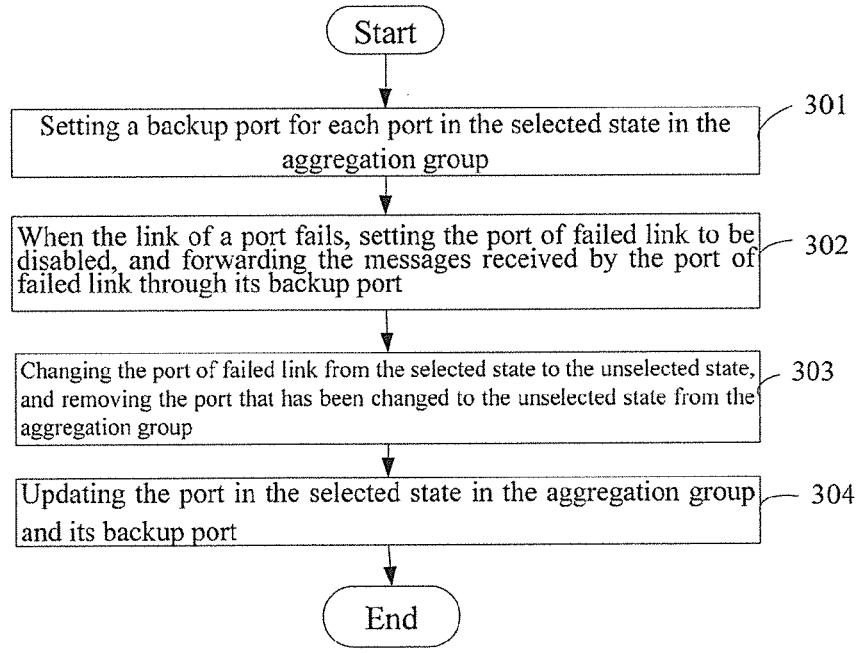
FIG. 7 is a flow diagram depicting operation of the control unit 40 under conditions of FIG. 3A, and FIGS. 8-10 are schematic diagrams depicting operation of the link aggregation methodology with reference to the example network of FIGS. 3 and 3A.

Many Ethernet switches nowadays include the feature of link aggregation wherein a plurality of physical links is grouped into a trunk or 'fat pipe'. The number of physical links in a trunk is usually limited and the common number is 8. One requirement of link aggregation is that each link in the same trunk must have the same physical characteristics. For example, physical links of a trunk are either all Gigabit (GE) or Fest Ethernet (FE) links operating in full duplex mode. Where link aggregation is utilized, an Ethernet switch as an example of a network data communication controller will regard the aggregated data ports or aggregated data links as a single logic unit. Each data port in a link aggregated group is configurable into two states, namely, a 'selected' state having and an 'un-selected' state not having normal data forwarding capability.

An example computer network utilizing conventional link aggregation methodology depicted in FIG. 1 comprises a first switch having 4 data ports, a second switch having 4 data ports, and 4 data links. The 4 data links are grouped together as a single logical link to form link aggregation, and each one of the links is connected to corresponding data ports of the first and second switches to provide interconnection. In this network, each of the data ports of the switches is either in the 'selected' or 'unselected states. A data port in the selected state is one having normal data or message forwarding capability while a data port in the unselected state is one not having normal data or message forwarding When the computer network is operating under normal link conditions, each of the data ports is in the selected state and each data port has data forwarding capability. On the other hand, when a data link is detected as faulty or disabled, the network controller will disable the data forwarding ability of the data port associated with the faulty data link and then change the data port into the unselected state. The data port which is changed into the unselected state will be subsequently removed from the aggregated group. Data loss in such a computer networking is quite noticeable and improvements are desirable.

In this specification, the terms data, packet and message are interchangeably used without loss of generality where the context permits. In addition, the term aggregated group means an aggregated group of data ports or an aggregated group of data links where appropriate.

According to an aspect of the present disclosure, there is provided a method of link aggregation in computer networking, wherein a plurality of data links is grouped to form link aggregation, and each data link of said plurality of data links is connected to a corresponding data port such that data traffic across the link aggregation is distributed across said plurality of data links by the corresponding plurality of data ports; wherein a backup data port is assigned to each data port of said corresponding plurality of data ports, each said backup data port being a data port selected from the corresponding plurality of data ports other than the data port to be assigned a backup port; and wherein the method comprises causing data originally scheduled for forwarding by a scheduled data port to be forwarded by the backup data port assigned to said scheduled data upon detection that said scheduled data port is connected to a data link which is not capable of data traffic.

There is also provided a computer network device adapted to support link aggregation, wherein a plurality of data links is grouped to form link aggregation, and each data link of said plurality of data links is connected to a corresponding data port such that data traffic across the link aggregation is distributed across said plurality of data links by the corresponding plurality of data ports; wherein a backup data port is assigned to each data port of said corresponding plurality of data ports, each said backup data port being a data port selected from the corresponding plurality of data ports other than the data port to be assigned a backup port; and wherein the computer network device comprises a controller adapted to detect conditions of said data, and to cause diversion of data originally scheduled for forwarding by a scheduled data port to be forwarded by the backup data port assigned to said scheduled data port upon detection that said scheduled data port is connected to a data link which is not capable of data traffic. The computer network devices may be a server, a network switch such as an Ethernet switch, or other network devices. The network switch may be a layer 2 switch such as a bridge, or a layer 3 switch such as a router.

By diverting data to a backup port for forward transmission upon detection of data link failure, data loss in link aggregated computer networks is mitigated.

In the computer network as depicted in FIG. 1, the operating conditions of a data link associated with a data port can be detected by polling the operation states of the data port or by the data port reporting its operation states at regular intervals. When a data link failure is detected, the data port associated with the failed data link will be disabled by the network controller and the data port can no longer forward data to the failed data link. When this happens, the data port is still in the selected state and is still receiving data, but is prevented from forwarding the received data to the associated data link. As a result, data is trapped and lost.

The table of FIG. 2 depicts periods of time during which data are lost in the computer network of FIG. 1 utilizing conventional link aggregation methodology under simulated link failure conditions for 3 different network switches. The data loss time after link failure and after link recovery are set out in the columns respectively entitled 'failure' and 'recovery'. It is noted from the simulations that data loss for over 100 ms is common place for downlink or forward transmission, and such data loss duration would mean the loss of many useful data.

The computer network of FIG. 3 comprises a server 100 having four data ports 101, 102, 103, 104, an Ethernet switch 200 having four data ports 201, 202, 203, 204, and an aggregated link group 140 comprising four data links 141, 142, 143, 144 which interconnects the server and the Ethernet switch. Each one of data links is connected with corresponding data ports on the server and the Ethernet switch such that the server and the Ethernet switches are communicable via the four data links as a single logical data link to increase bandwidth and resilience. In other examples, both the first and second computer network devices could be network switches.

Each of the server 100 and Ethernet switch 200, as an example of a computer network device, comprises a control unit 40 as an example of a network controller, and a forwarding unit 47. The control unit comprises a storage unit 41, a detection unit 42, a management unit 43, an update unit 44, a selection unit 45, and a determination unit 46.

The storage unit 41 is adapted to store data port information, for example, the port identity of each of the data ports in the aggregated data port group which are in the selected state, and the identity of the backup data ports assigned to each data port.

The detection unit 42 is adapted to detect the operation conditions of the data links associated with the data ports which are in the selected state, for example, by examining the operation conditions of data links associated with the data ports whose identity is stored in the storage unit 41, and to disable a data port associated with a failed data link upon detection that the data link is failed. In addition, the detection unit 42 is adapted to inform the management unit 43 that a data port is now associated with a failed data link.

The management unit 43 is adapted to set the operating states of the data ports according to received information relating to the operation conditions of the data links associated with the data ports. For example, the management unit 43 is arranged to set the state of a data port into the unselected state upon receipt of information from the detection unit 42 that the data port is now associated with a failed data link. The management unit 43 will then forward the information on the change of operating state of the data port to the update unit 44. In addition, the management unit 43 is also adapted to assign a backup data port for each data port of the aggregated data port group in the selected state.

The update unit 44 is arranged to update data port information stored in the storage unit 41 and to remove a data port, which is now in the unselected state, from the list of data ports stored in the storage unit 41 as one belonging to the aggregated data port group.

The selection unit 45 is arranged to select a data port for data forwarding by selecting a data port from the list of data ports stored in the storage unit 41 according to a predetermined data forwarding scheme.

The determination unit 46 is arranged to determine whether a data port selected or scheduled by the selection unit 45 has been disabled. If the scheduled port is already disabled, the determination unit 46 will instruct the selection unit 45 to select a backup port assigned to the scheduled data port for data forwarding. If the scheduled data port is not disabled, the determination unit 46 will instruct the selection unit 45 to forward data by the scheduled data port.

The forwarding unit 47 is adapted to put data onto the aggregated data link for forward transmission. Where data is scheduled for forwarding by a scheduled data port but the scheduled data port is disabled while in the selected state, the forwarding unit 47 will cause the data to be forwarded by the backup data port assigned to the scheduled data port, until the disabled data port is in the unselected state.

Figure 8:
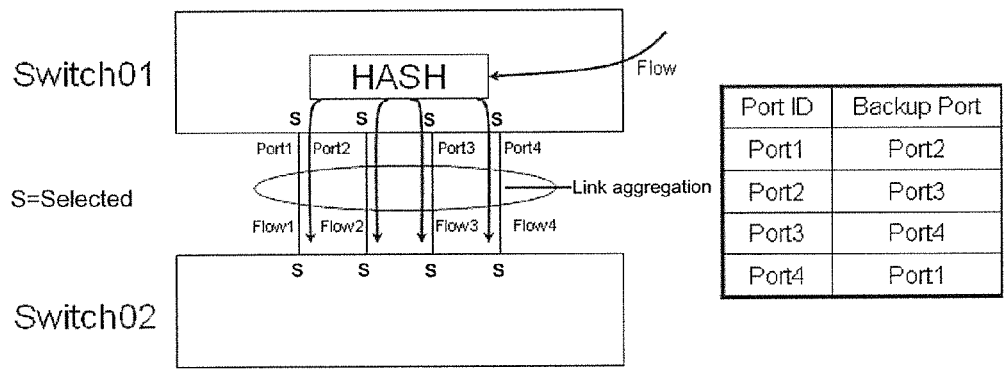
Figure 9:
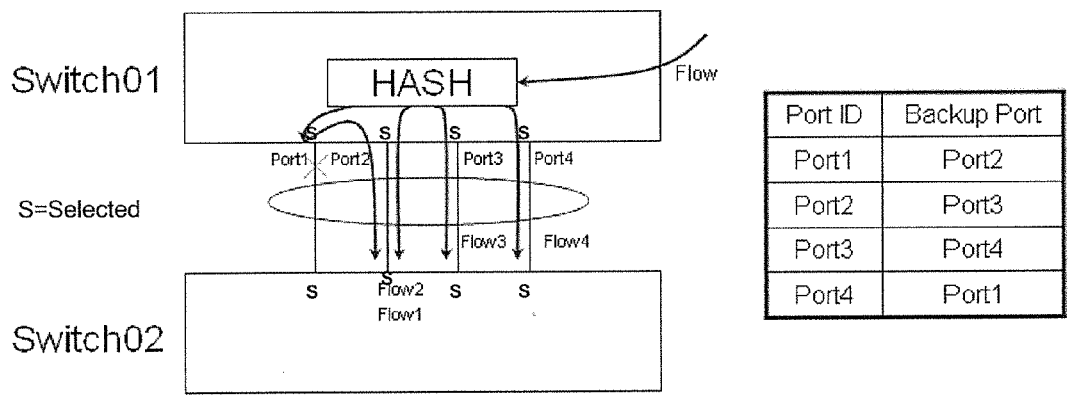
Figure 10:
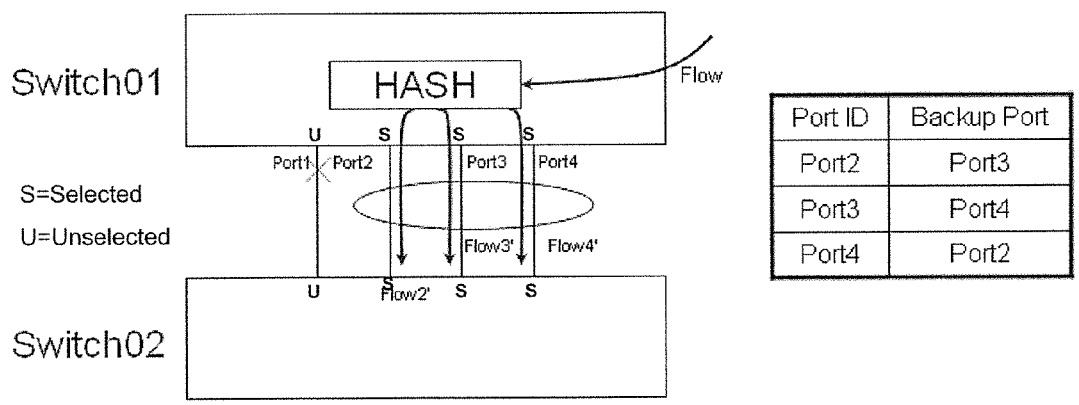

When the computer network of FIG. 3 is in operation, the detection unit 42 will detect the operation conditions of the four data links 141, 142, 143, 144. If the data links are in normal data forwarding conditions, the associated data ports 101, 102, 103, 104 will be set into the selected state and grouped by the network controller 40 as an aggregated data port group to form link aggregation. In addition, the network controller 40 also assigns a backup data port for each data port, and a backup port is selected from the plurality of data ports belonging to the aggregated data port group other than the data port to be assigned a backup data port without loss of generality. After link aggregation has been formed, information on the identity of the data ports forming the aggregated data port group as well as that on the identity of the backup data ports will be stored in the storage unit 41. When determining which port is to be assigned as a backup port for a particular data port, various methods such as round-robin or weighing can be used. In the examples of FIGS. 8-10, backup data ports are assigned by round-robin as a convenient example.

Assuming that one of the data links, say data link 141, is now detected as faulty as depicted in FIG. 3A, the network controller 40 will operate to mitigate data loss by taking the following measures as depicted in FIGS. 7-10. Upon detection of a failed or faulty data link 141, the network controller 40 will disable the data port 101, which is associated with the faulty data link 141, to prevent it from forwarding data. At this moment, the data port 101 is still in the selected state according to LACP or other applicable control protocols. In addition, the network controller 40 will cause the data originally scheduled for forward transmission to the Ethernet switch 200 by the now disabled data port 101 to be diverted to its backup port 102 for forward transmission by the backup port 102 while the disabled data port 101 is still in the selected state. After the network controller 40 has facilitated the data diversion, it will then change the data port 101 into the unselected state and remove this data port from the aggregated data port group. After data port 101 has been removed from the aggregated link, the network controller 40 will reassign backup ports for each data port remaining in the aggregated link according to a predetermined methodology such as the round-robin or weighing methods.

When the detection unit 42 subsequently detects that the faulty data link has recovered, the management unit 43 will then restore the data port 101 from the unselected state to the selected state and re-include the selected data port into link aggregation. The management unit will then include the identity of the restored data port on the storage unit 43 and re-arrange the backup data ports.

While the disclosure has been explained with reference to the above examples, it will be appreciated by persons skilled in the art that the examples are non-limiting examples to assist understanding of the disclosure. For example, while an Ethernet switch and a server each having 4 data ports has been used as an example of a computer network apparatus, it will be appreciated other computer network apparatus supporting link aggregation and/or other numbers of data ports can be used. In addition, while link aggregation at a specific OSI layer has been described for illustration, it will be appreciated that the techniques are useful for other OSI layers supporting link aggregation without loss of generality. Moreover, while various functional units have been used to describe the example server and the Ethernet switch (as an example of a network switch), it will be appreciated that the use of such functional units is merely for convenience and the functional units can be implemented within the controller by software or firmware means without clear hardware compartmentalization. For example, the various functions of the functional units may be performed by one or more processors, logic units, or an ASIC or ASICs. Furthermore, while each one of the computer network devices 100, 200 of the example network of FIG. 3 is equipped with the afore-mentioned methodology of the present disclosure, it will be appreciated that a computer network device according to the present disclosure may be fully compatible with a conventional network device not incorporating the afore-mentioned methodology.

The invention claimed is:

1. A hardware control unit comprising:
    a detection unit to receive detected conditions of data traffic across a link aggregation formed of a plurality of data links, wherein each data link of the plurality of data links is connected to a corresponding data port such that the data traffic across the link aggregation is distributed across the plurality of data links by the corresponding plurality of data ports, wherein a backup data port is assigned to each data port of said corresponding plurality of data ports, each said backup data port being a data port selected from the corresponding plurality of data ports other than the data port to be assigned a backup port;
    a selection unit to select a backup data port upon detection that a data port originally scheduled to forward data is connected to a data link that is not capable of data traffic; and
    a forwarding unit to cause diversion of the data originally scheduled for forwarding by the scheduled data port to be forwarded by the selected backup data port assigned to the scheduled data port.

2. The hardware control unit of claim 1, wherein each of the plurality of data ports is in one of a selected state and an un-selected state, wherein in the selected state, the data port has normal message forwarding ability and in the un-selected state, the data port does not have normal message forwarding ability, and wherein the selection unit is to forward data by the backup data port assigned to said scheduled data port upon a detection that a failed data link is connected to said scheduled data port when said scheduled data port is in the selected state.

3. The hardware control unit of claim 2, further comprising:
    a management unit to configure the scheduled data port into the un-selected state after data have been caused to be forwarded by the assigned backup data port; and
    an update unit to remove the scheduled data port from said link aggregation.

4. The hardware control unit of claim 3, wherein the management unit is further to reassign a backup data port to each data port remaining in the link aggregation after the scheduled data port has been removed from the link aggregation and to restore a removed data port into a data port of the link aggregation and reassign backup data ports when the removed data port is changed from an un-selected state to a selected state.

5. The hardware control unit of claim 3, wherein the management unit is further to reassign backup data ports upon a detection that a data port in the link aggregation is connected to a failed or disabled data link.

6. The hardware control unit of claim 5, wherein the management unit is further to remove the data port as being a backup data port upon a detection that said data port is connected to a failed or disabled data link.

7. The hardware control unit of claim 1, wherein the control unit is an application specific integrated circuit.

8. The hardware control unit of claim 1, wherein the forwarding unit is further to forward data originally scheduled for forwarding by said scheduled data port by the backup data port until the scheduled data port is in the un-selected state.

9. The hardware control unit of claim 1, wherein the detection unit is to detect conditions of the data links of the link aggregation and wherein the selection unit is to select the backup data port upon detection that the data port is connected to a failed or disabled data link.

10. A method comprising:
    receiving, by a hardware control unit, conditions of data traffic across a link aggregation formed of a plurality of data links, wherein each data link of the plurality of data links is connected to a corresponding data port such that the data traffic across the link aggregation is distributed across the plurality of data links by the corresponding plurality of data ports, wherein a backup data port is assigned to each data port of said corresponding plurality of data ports, each said backup data port being a data port selected from the corresponding plurality of data ports other than the data port to be assigned a backup port;
    detecting, by the hardware control unit, that a data port scheduled to forward data is not capable of data traffic;
    selecting, by the hardware control unit, a backup data port corresponding to the scheduled data port; and causing, by the hardware control unit, diversion of the data originally scheduled for forwarding by the scheduled data port to be forwarded by the selected backup data port assigned to the scheduled data port.

11. The method of claim 10, wherein each of the plurality of data ports is in one of a selected state and an un-selected state, wherein in the selected state, the data port has normal message forwarding ability and in the un-selected state, the data port does not have normal message forwarding ability, and wherein the hardware control unit is to forward data by the backup data port assigned to said scheduled data port upon a detection that a failed data link is connected to said scheduled data port when said scheduled data port is in the selected state.

12. The method of claim 11, further comprising:
configuring the scheduled data port into the un-selected state after causing data to be forwarded by the backup data port; and
removing the scheduled data port from said link aggregation.

13. The method of claim 12, further comprising:
reassigning a backup data port to each data port remaining in the link aggregation after the scheduled data port has been removed from the link aggregation;
restoring a removed data port into a data port of the link aggregation; and
reassigning backup data ports when the removed data port is changed from an un-selected state to a selected state.

14. The method of claim 10, further comprising:
reassigning backup data ports upon a detection that a data port in the link aggregation is connected to a failed or disabled data link.

15. The method of claim 14, further comprising:
removing the data port as being a backup data port upon a detection that said data port is connected to a failed or disabled data link.

\* \* \* \* \*